United States Patent [19]
Laine et al.

[11] Patent Number: 6,165,351
[45] Date of Patent: *Dec. 26, 2000

[54] SILICA BAYERITE/ETA ALUMINA

[75] Inventors: Norman Raymond Laine, Rockville; John Allen Rudesill, Columbia; Wu-Cheng Cheng, Ellicott City, all of Md.

[73] Assignee: W. R. Grace & Co.-Conn., New York, N.Y.

[ * ] Notice: This patent is subject to a terminal disclaimer.

[21] Appl. No.: 08/200,595

[22] Filed: Feb. 23, 1994

Related U.S. Application Data

[60] Division of application No. 07/827,119, Jan. 28, 1992, Pat. No. 5,304,526, which is a continuation-in-part of application No. 07/780,680, Oct. 18, 1991, Pat. No. 5,147,836.

[51] Int. Cl.$^7$ .......................... C10G 11/04; C10G 11/02
[52] U.S. Cl. ................. 208/118; 208/120.25; 208/122
[58] Field of Search .................. 208/119, 120, 208/120 MC, 122, 120.25; 502/235, 263

[56] References Cited

U.S. PATENT DOCUMENTS

| | | | |
|---|---|---|---|
| 1,958,710 | 5/1934 | Moyer | 23/141 |
| 2,935,483 | 5/1960 | Schwartz | 502/235 |
| 2,980,632 | 4/1961 | Malley et al. | 252/465 |
| 2,988,520 | 6/1961 | Braithwaite | 252/455 |
| 3,025,248 | 3/1962 | Oleck et al. | 252/466 |
| 3,086,845 | 4/1963 | Malley et al. | 23/143 |
| 3,096,154 | 7/1963 | Stewart | 23/143 |
| 3,403,111 | 9/1968 | Colgan et al. | 252/465 |
| 3,623,837 | 11/1971 | Kelly et al. | 23/143 |
| 3,864,461 | 2/1975 | Miller et al. | 423/628 |
| 4,019,978 | 4/1977 | Miller et al. | 208/213 |
| 4,154,812 | 5/1979 | Sanchez et al. | 423/626 |
| 4,247,420 | 1/1981 | Dumoulin et al. | 502/235 |
| 4,313,923 | 2/1982 | Block et al. | 423/628 |
| 4,497,907 | 2/1985 | Halluin et al. | 502/235 |
| 4,568,527 | 2/1986 | Anjier et al. | 423/127 |
| 4,755,374 | 7/1988 | Martin et al. | 423/627 |
| 4,766,101 | 8/1988 | Nortier et al. | 502/164 |
| 4,780,446 | 10/1988 | Nozemack et al. | 502/235 |
| 4,849,190 | 7/1989 | de Castro Marshbacker et al. | 423/124 |
| 5,304,526 | 4/1994 | Laine et al. | 502/235 |
| 5,306,417 | 4/1994 | Cheng et al. | 208/120 |

FOREIGN PATENT DOCUMENTS

| | | |
|---|---|---|
| 0385246 | 9/1990 | European Pat. Off. . |
| 0990720 | 4/1965 | United Kingdom . |

*Primary Examiner*—Walter D. Griffin
*Attorney, Agent, or Firm*—Robert A. Maggio

[57] ABSTRACT

A silica-containing bayerite alumina is prepared by reacting aluminum sulfate, sodium aluminate and sodium silicate at a pH of about 10.5 to 11.5, preferably in the presence of finely divided magnesium hydroxide "seeds". The silica-containing bayerite is heated to obtain a hydrothermally stable silica "stabilized" eta alumina which may be used in the preparation of catalytic compositions.

5 Claims, 2 Drawing Sheets

SILICA BAYERITE/ETA ALUMINA

This is a division, of application Ser. No. 07/827,119, filed Jan. 28, 1992, now U.S. Pat. No. 5,304,526, which is a continuation-in-part of application Ser. No. 07/780,680, filed Oct. 18, 1981, now U.S. Pat. No. 5,147,836.

BACKGROUND OF THE INVENTION

The present invention relates to novel alumina compositions and more particularly to improved bayerite/eta alumina compositions that possess a high degree of hydrothermal stability.

Bayerite, which is converted to eta alumina by heating at temperatures of from about 200 to 800° C., have been used in the preparation of various catalytic compositions including hydrocarbon conversion catalyst.

EP 0385246 describes fluid catalytic cracking (FCC) catalysts that contain a bayerite/eta alumina component that improves the performance of FCC in the presence of hydrocarbon feedstocks that contain nickel.

While bayerite/eta alumina exhibits considerable resistance to thermal degradation at elevated temperatures, it has been found that the high temperature hydrothermal (steam) conditions encountered in commercial FCC cracking units tend to deactivate bayerite/eta alumina components over a relatively short period.

SUMMARY OF THE INVENTION

It is therefore an object of the present invention to provide a novel bayerite/eta alumina composition which possesses a high degree of hydrothermal stability.

It is a further object to provide improved bayerite/eta alumina which may be used in the preparation of catalytic compositions.

It is yet another object to provide a method by which commercial quantities of highly stable bayerite/eta alumina may be economically produced.

It is still a further object to provide fluid catalytic cracking catalyst compositions which may be used to crack hydrocarbon feedstocks that contain Ni and/or V.

BRIEF DESCRIPTION OF THE DRAWINGS

These and still further objects will become readily apparent to one skilled-in-the-art from the following detailed description and drawings wherein.

BRIEF DESCRIPTION OF THE INVENTION

Figure 1:
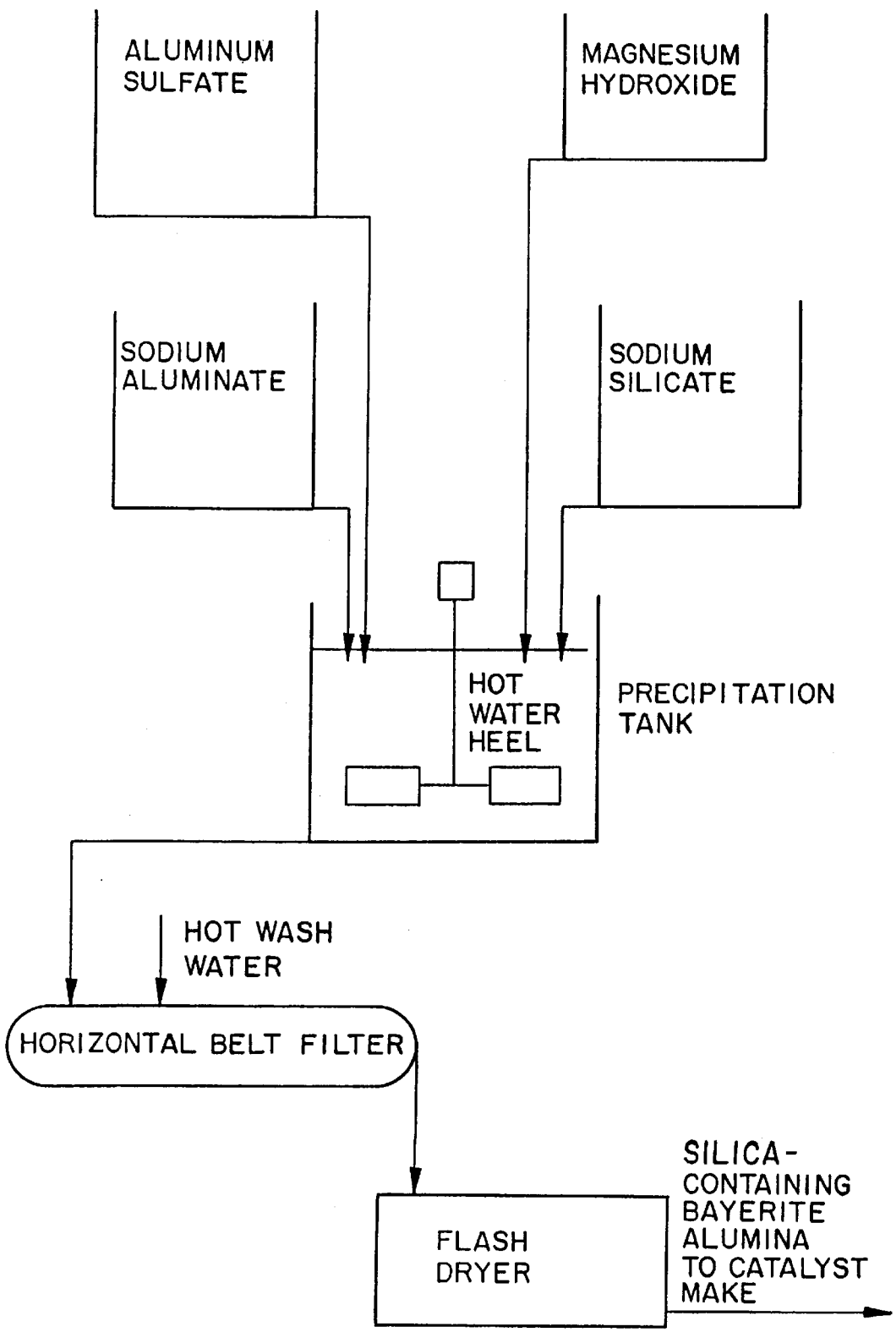
FIG. 1 is a flow diagram that outlines a preferred method for preparing the novel products of our invention.

Broadly, our invention contemplates bayerite/eta aluminas which contain from about 0.5 to 10 weight percent silica ($SiO_2$), and optionally up to about 2 weight percent magnesia (MgO).

More particularly, we have found that a novel silica containing bayerite may be prepared by reacting aqueous solutions of sodium aluminate, aluminum sulfate and sodium silicate at a pH of about 10.5 to 11.5, preferably in the presence of finely divided magnesium hydroxide "seeds" which function as bayerite crystallization nucleation centers to "direct" to formation of bayerite. The novel silica containing bayerite may then be converted to hydrothermally stable silica containing eta alumina by heating to temperatures of from about 200 to 800° C.

The novel silica bayerite possesses the following chemical and physical characteristics:

(1) a chemical composition which includes from about 0.5 to 10, and more preferably 2 to 7 weight percent $SiO_2$ wherein the $SiO_2$ component is dispersed throughout the alumina as a coprecipitated component, and less than 2 weight percent $Na_2O$, and optionally 0.1 to 2.0 weight percent MgO;

(2) a surface area of 300 to 400 $m^2/g$ after calcination at 538° C. for 2 hours;

(3) a pore volume of 0.3 to 0.5 cc/g distributed on pores ranging from 20 to 1500 Å;

(4) an X-ray diffraction pattern which indicates the presence of 70 to 95 weight percent bayerite and 5 to 30 weight percent other alumina(s) including pseudoboehmite.

Upon heating to temperatures of 200 to 800° C., the silica-containing bayerite is converted to silica containing eta alumina which has the following properties:

(1) A chemical composition comprising 0.5 to 10 weight percent $SiO_2$, less than 2 weight percent $Na_2O$ which is uniformly distributed throughout the alumina structure, and optionally 0.1 to 2.0 weight percent MgO;

(2) A surface area of 300 to 400 $m^2/g$ after heating to 538° C. in the absence of added steam;

(3) A pore volume of 0.3 to 0.5 cc/g upon heating to 538° C. in the absence of added steam.

A preferred method for preparing the compositions of our invention is outlined in the drawing and comprises the following steps:

(1) Preparing aqueous solutions of sodium silicate, aluminum sulfate and sodium aluminate which contain 2 to 25 weight percent silica, 2 to 8 weight percent alumina and 10 to 22 weight percent alumina, respectively;

(2) Preparing a finely divided aqueous suspension of magnesium hydroxide by reacting magnesium sulfate with sodium hydroxide to obtain 0.05 to 0.15 weight percent suspended $Mg(OH)_2$;

(3) The reactants are combined in a mixed reaction vessel which contains a water heel heated to a temperature of 30 to 100° C., preferably by first adding the magnesium hydroxide seed suspension (or the reactant precursors thereof): then simultaneously adding the sodium aluminate and aluminum sulfate solutions; and finally adding the sodium silicate solution during the latter part of the reaction period.

(4) The rate of addition of the reactants is regulated to maintain a reaction pH of about 10.5 to 11.5 over the duration of the reaction currently set at 100 minutes.

(5) Upon completion of the reaction/aging step, the precipitated hydrous silica containing bayerite product is recovered by filtration, washed with water to remove soluble sodium sulfate impurities, flash dried to obtain 30–35% total volatiles in powder, and optionally calcined at 200 to 800° C. to convert the bayerite to eta alumina.

The silica-containing bayerite/eta alumina of our invention may be advantageously added to FCC catalysts to improve the performance thereof in the presence of nickel. Typically, FCC catalysts which contain a zeolite/molecular sieve component such as synthetic faujasite (type X & Y zeolite), ZSM-5, and/or zeolite beta dispersed in an inorganic oxide matrix such as clay, silica, alumina and silica-alumina hydrogels, may be combined with from about 1 to 50 weight percent of the silica containing bayerite/eta alumina described herein.

In addition, the novel compositions may be used in the preparation of catalyst supports for noble metals, metals, nonmetals and compounds thereof such as oxides, sulfides, halides, chalcogenides, and combinations of said materials.

Having described the basic aspects of our invention, the following examples are set forth to illustrate specific embodiments.

EXAMPLE 1

Preparation of Silica Containing Baverite

Sodium aluminate, sodium silicate, and aluminum sulfate solutions were prepared as follows:

(a) Sodium aluminate—900 lbs of solution containing 20 weight percent alumina and 17 weight percent $Na_2O$ having a specific gravity of 1.44 g/ml was prepared by reacting $Al_2O_3$ powder to sodium hydroxide solution.

(b) Sodium silicate—42 lbs of 38° Be sodium silicate solution having 3.25 weight ratio $SiO_2$ to $Na_2O$ was diluted with 70 lbs $H_2O$.

(c) Aluminum sulfate—1200 lbs. of solution containing 7.0 weight percent alumina and 20 weight percent sulfate with specific gravity of 1.28 g/ml was prepared by reacting $Al_2O_3$ powder with $H_2SO_4$.

A 500 gallon agitated reactor was charged with a 185 gallon water heel at 140° F. The reaction temperature was kept in the 140–150° F. range. Then 5 lbs. of magnesium sulfate heptahydrate powder was added, followed by 5 lbs of 50% caustic soda. The pH was between 11.3 and 11.6 and the mixture was permitted to react for 5 minutes to form an aqueous suspension $Mg(OH)_2$ seed particulates. The aluminate flow was then started at a rate of 0.75 GPM and the aluminum sulfate flow was started 5 seconds later at a rate of 0.4 GPM until the pH dropped to 11.0 after which the flow rate was adjusted to maintain a pH of 10.70 to 10.75. Silicate flow was started at a rate of 0.25 GPM after the initial pH decreased to 11.0 (between 5 and 7 minutes). The addition of reactants (strike) was continued for 100 minutes, after which the slurry was stabilized to pH 9.7 with aluminum sulfate. The silica containing bayerite slurry was filtered and washed with 150° F. water on a horizontal vacuum belt filter. The filter cake was collected on trays and oven dried at a temperature of 205° F.

The final product had the following chemical, physical and X-ray (crystalline) properties.

| Chemical Analysis | |
|---|---|
| weight percent T.V. | 39.5 |
| weight percent $Na_2O$ | 1.24 |
| weight percent $SO_4$ | 0.13 |
| weight percent $SiO_2$ | 3.95 |
| weight percent MgO | 0.35 |
| X-ray Analysis: | |
| Bayerite | 79% crystallinity |
| Pseudoboehmite | Remainder |

EXAMPLE 2

Preparation of Silica Containing Eta Alumina

A sample of the silica-containing bayerite of Example 1 was heated to a temperature of 538° C. for 120 minutes to convert the bayerite of Example 1 to eta alumina having BET surface area of 381 $m^2/g$ and a nitrogen pore volume of 0.42 cc/g.

EXAMPLE 3

A.) Bayerite (Alumina A) was prepared as follows:

Sodium aluminate and aluminum sulfate were prepared according to the methods of U.S. Pat. No. 4,154,812 and kept at 125° F. To 185 gallons of water at 140° F. sodium aluminate was added at a rate of 0.75 gallons per minute. Aluminum sulfate was simultaneously added at a rate to keep the pH constant at 10.75 and precipitate alumina. The precipitation reaction was continued for 100 minutes. Afterwards the flow of sodium aluminate was terminated. The pH of the slurry was adjusted to a final value of 9.7 with additional aluminum sulfate. The precipitated alumina was recovered by filtration and washed with tap water at 150° F. and oven dried.

B.) Silica modified bayerite (Alumina B) was prepared as follows:

The same procedure as part A was used with the following exception. A third stream containing sodium silicate, having 10% $SiO_2$ and 3% $Na_2O$ was added during the precipitation at a rate of one liter per minute. A total of 112 lbs of the sodium silicate was used to give 4% $SiO_2$ on the final product.

EXAMPLE 4

Figure 2:
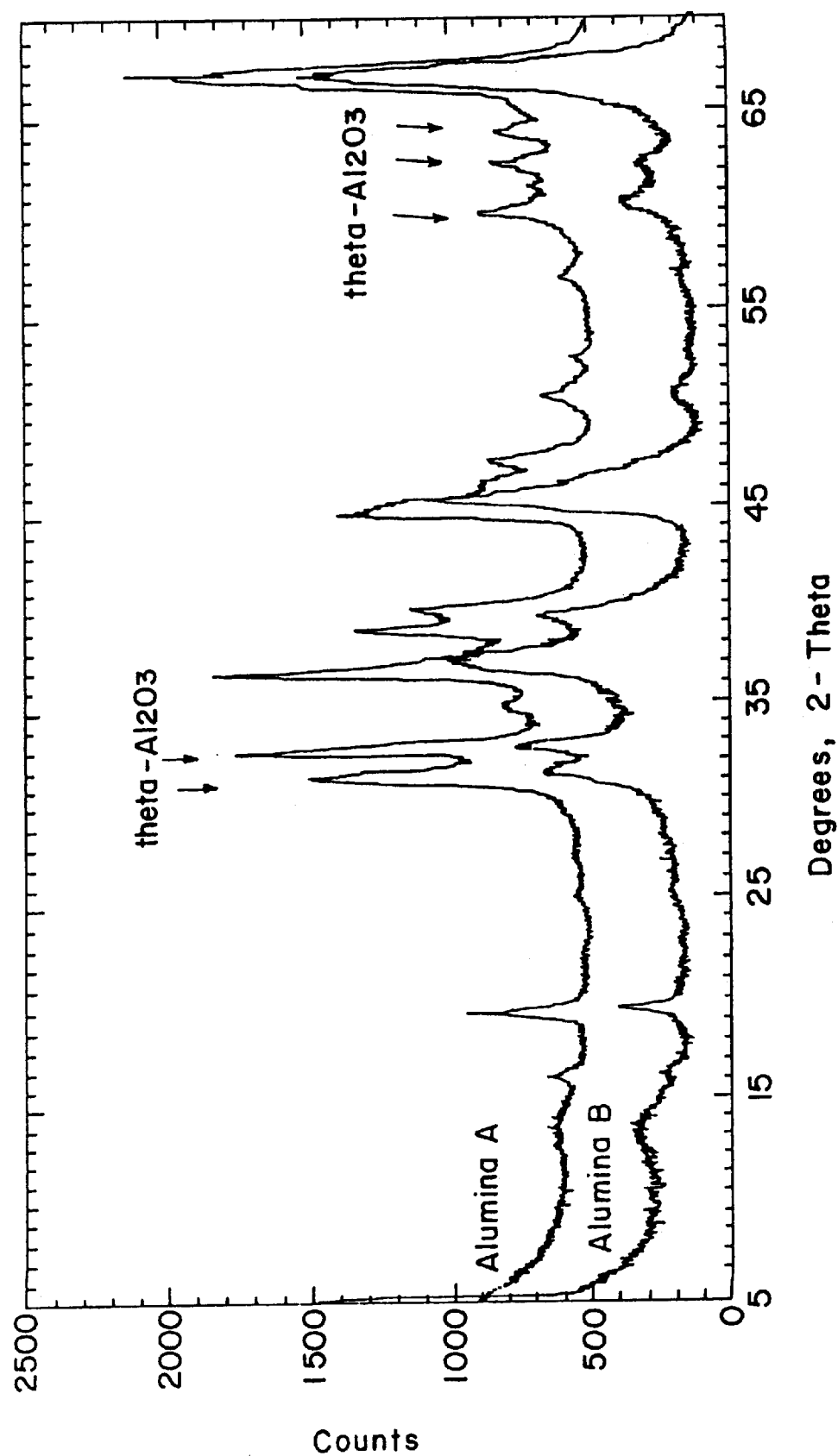
FIG. 2 is a graphic representation of X-ray diffraction data which illustrates the hydrothermal stability of the silica modified bayerite/eta alumina our invention.

The properties of Alumina A and Alumina B are shown in Table I. Upon calcination in air for 2 hours at 1000° F., Alumina B exhibited higher BET surface area and nitrogen pore volume than Alumina A. Upon steaming at atmospheric pressure for 4 and 8 hours at 1500° F. and 4 hours at 1600° F., Alumina B exhibited about 60% greater surface area retention than Alumina A. Furthermore, as shown in FIG. 2, whereas Alumina A undergoes significant transformation to theta-alumina upon steaming for 4 hours at 1600° F., Alumina B still exhibits predominantly eta-alumina with only a minor amount of theta-alumina. Thus the silica-stabilized alumina exhibits both greater surface area and phase stability than the unstabilized alumina.

EXAMPLE 5

A.) Catalyst A was prepared as follows:

7.3 kg of ultrastable Y zeolite was blended with 2.95 kg of Alumina A and slurried in 29.7 kg of water. The zeolite and alumina slurry was mixed in a high intensity mixer and milled to a fine particle size. 18.6 kg of this slurry was added to 4.9 kg of clay and 26.7 kg of silica sol, prepared according to the teachings of U.S. Pat. No. 3,957,689 and spray dried. The spray dried catalyst was washed with an ammonium sulfate solution to remove the $Na_2O$ and exchanged with a rare earth chloride solution to obtain 2.6 to 2.7 weight percent rare earth oxide on Catalyst.

B.) Catalyst B, having the same composition as Catalyst A, with the only exception that a silica modified bayerite having 4 wt. % $SiO_2$ (Alumina B) was substituted in place of bayerite, was prepared. Properties of Catalysts A and B are shown in Table II.

EXAMPLE 6

Both Catalysts A and B of Example 3 were steamed for 4 hours at 1500° F. in a fluidized bed under atmospheric pressure of steam. After steaming, Catalyst B exhibited a higher matrix area than Catalyst A. The two steamed catalysts were evaluated for their ability to crack a Sour Import Heavy Gas Oil in a microactivity test unit (ASTM D-3907-80). The yield comparison is shown in Table III. The catalyst of the present invention (Catalyst B) yielded lower dry gas ($C_1+C_2$'s), lower LPG ($C_3+C_4$), higher gasoline and higher LCO. The higher yield of LCO, or better bottoms cracking, could be attributed to the higher matrix area of Catalyst B. However, the improved gasoline yield was an unexpected result.

EXAMPLE 7

Catalysts A and B were treated with 50% steam at 1500° F. and atmospheric pressure for 12 hours, impregnated with nickel and vanadium naphthenates to a level of 2000 ppm Ni and 2700 ppm V, and treated with steam (30V %) again at 1500° F. and atmospheric pressure for 4 hours. The metals treated catalysts have the properties shown on Table II. The metals treated catalysts were evaluated in the Davison Circulating Riser (DCR) pilot plant. The results of the evaluation are shown in Table IV. Catalyst B was higher in activity than catalyst A, as indicated by the lower catalyst to oil required to achieve a constant level of conversion. In addition, catalyst B yielded lower hydrogen and coke and higher gasoline. This illustrates the improved metals tolerance properties of the silica stabilized bayerite/eta alumina.

TABLE I

Properties of Bayerite (Alumina A) and Silica-Modified Bayerite (Alumina B)

| | Alumina A | Alumina B |
|---|---|---|
| Average Particle Size/$\mu$ | 28 | 12 |
| Bulk Density/g cm$^{-3}$ | 0.9 | 0.9 |
| TV | 33.6 | 39.0 |
| % SO$_4$ | 0.17 | 0.13 |
| % SiO$_2$ | — | 3.95 |
| BET @ 1000° F./m$^2$g$^{-1}$ | 335 | 381 |
| N2 PV/cm$^3$g$^{-1}$ | 0.29 | 0.42 |
| Steaming Study | | |
| BET 4 hours @ 1500° F./m$^2$g$^{-1}$ | 99 | 154 |
| BET 8 hours @ 1500° F./m$^2$g$^{-1}$ | 91 | 147 |
| BET 4 hours @ 1600° F./m$^2$g$^{-1}$ | 79 | 122 |

TABLE II

Properties of Catalysts A and B

| | Catalyst A | Catalyst B |
|---|---|---|
| Chemical Analysis | | |
| Na$_2$O | 0.36 | 0.38 |
| Al$_2$O$_3$ | 33.1 | 33.7 |
| RE$_2$O$_3$ | 2.7 | 2.6 |
| SO$_4$ | 0.42 | 0.49 |
| Physical Properties/2 hours @ 1000° F. | | |
| Davison Index | 6 | 8 |
| Average Bulk Density/cm$^3$g$^{-1}$ | 0.72 | 0.70 |
| Zeolite Area/m$^2$g$^{-1}$ | 187 | 197 |
| Matrix Area/m$^2$g$^{-1}$ | 86 | 85 |
| Relative Zeolite Intensity | 96 | 91 |
| Average Particle Size/$\mu$ | 67 | 71 |
| 4 hours @ 1500° F./100% steam | | |
| Unit Cell Size/Å | 24.29 | 24.29 |
| Relative Zeolite Intensity | 60 | 64 |

TABLE II-continued

Properties of Catalysts A and B

| | Catalyst A | Catalyst B |
|---|---|---|
| Zeolite Area/m$^2$g$^{-1}$ | 124 | 127 |
| Matrix Area/m$^2$g$^{-1}$ | 38 | 43 |
| Metals Test | | |
| Unit cell size/Å | 24.28 | 24.29 |
| Relative Zeolite Intensity | 56 | 62 |
| Zeolite Area | 120 | 128 |
| Matrix Area | 35 | 43 |
| ppm Ni | 2049 | 2061 |
| ppm V | 2740 | 2720 |

TABLE III

Yield Comparison of Catalysts A and B

| | Catalyst A | Catalyst B |
|---|---|---|
| % Conversion | 70 | 70 |
| C/O | 4.28 | 4.15 |
| Yields | | |
| H$_2$ | .055 | .058 |
| C$_1$ + C$_2$'s | 2.6 | 2.4 |
| C$_3$ olefins | 4.5 | 4.4 |
| Total C$_3$'s | 6.0 | 5.7 |
| C$_4$ olefins | 4.7 | 4.5 |
| iso C$_4$ | 4.2 | 4.1 |
| Total C$_4$'s | 10.0 | 9.7 |
| C$_{5+}$ Gasoline | 47.7 | 48.5 |
| LCO | 19.5 | 19.9 |
| HCO | 10.5 | 10.5 |
| Coke | 3.6 | 3.6 |
| Mass Balance | 99.96 | 99.96 |

TABLE IV

DCR Constant Conversion Comparison

| Catalyst | Catalyst A | Catalyst B |
|---|---|---|
| Catalyst to Oil | 5.2 | 4.7 |
| Conversion, vol. % | 78 | 78 |
| H$_2$, wt. % | 0.54 | 0.50 |
| C$_1$ + C$_2$'s, wt. % | 3.27 | 3.02 |
| C$_3$=, vol. % | 7.6 | 7.5 |
| nC$_3$, vol. % | 2.1 | 2.1 |
| Total C$_3$'s, vol. % | 9.8 | 9.5 |
| C$_4$=, vol. % | 8.0 | 8.3 |
| iC$_4$, vol. % | 3.9 | 3.9 |
| nC$_4$, vol. % | 0.9 | 0.9 |
| Total C$_4$'s, vol. % | 12.7 | 13.0 |
| Gasoline, 430° F., vol. % | 61.6 | 62.4 |
| LCO, 430–640° F., vol. % | 12.6 | 12.6 |
| API | 19.0 | 19.0 |
| Bottoms, 640° F.+, vol. % | 9.4 | 9.4 |
| API | 2.1 | 2.1 |
| Coke, wt. % | 8.6 | 8.2 |

We claim:

1. A method of cracking hydrocarbons which comprises reacting a hydrocarbon feedstock under catalytic cracking conditions in the presence of a cracking catalyst which contains about 1 to 50 weight percent of a composition comprising bayerite, 0.5 to 10 weight percent silica wherein the silica is uniformly distributed throughout the bayerite, and up to about 2 weight percent magnesia whereby said silica acts to inhibit the conversion of said bayerite to theta alumina.

2. The method of claim 1 wherein said bayerite-containing composition comprises at least 70 wt. % crystalline bayerite.

3. The method of claim 1 wherein said bayerite-containing composition has a surface area of 300 to 400 m²/g and a pore volume of 0.30 to 0.50 cc/g in pores ranging from 20 to 1500 Å.

4. A method of cracking hydrocarbons which comprises reacting a hydrocarbon feedstock under catalytic cracking conditions in the presence of a cracking catalyst which contains about 1 to 50 weight percent of a composition comprising eta alumina, 0.5 to 10 weight percent silica wherein the silica is uniformly distributed throughout the eta alumina, and up to about 2 weight percent magnesia whereby said silica acts to inhibit the conversion of said eta alumina to theta alumina.

5. The method of claim 4 wherein said eta alumina-containing composition has a surface area of 300 to 400 m²/g and a pore volume of 0.30 to 0.50 cc/g in pores ranging from 20 to 1500 Å.

* * * * *